(12) United States Patent
Spath et al.

(10) Patent No.: US 9,550,485 B2
(45) Date of Patent: Jan. 24, 2017

(54) PLUG RETENTION SYSTEM FOR A BRAKE ACTUATOR

(71) Applicant: Bendix Spicer Foundation Brake LLC, Elyria, OH (US)

(72) Inventors: Timothy T. Spath, Lakewood, OH (US); Will Roberts, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 142 days.

(21) Appl. No.: 14/635,227

(22) Filed: Mar. 2, 2015

(65) Prior Publication Data

US 2016/0257290 A1 Sep. 8, 2016

(51) Int. Cl.
*B60T 11/10* (2006.01)
*B60T 17/08* (2006.01)
*F16D 65/18* (2006.01)
*F16D 121/10* (2012.01)

(52) U.S. Cl.
CPC .............. *B60T 17/083* (2013.01); *B60T 11/10* (2013.01); *F16D 65/18* (2013.01); *F16D 2121/10* (2013.01)

(58) Field of Classification Search
CPC ....... B65D 39/16; B65D 39/10; B65D 39/089; B65D 41/065; B65D 41/04; B65D 41/0471; B65D 39/08; B60K 15/0406; B60T 17/085
See application file for complete search history.

(56) References Cited

U.S. PATENT DOCUMENTS

| | | | |
|---|---|---|---|
| 3,883,030 A | 5/1975 | Mathews et al. | |
| 4,325,237 A | 4/1982 | Menzie | |
| 4,497,419 A | * 2/1985 | Reitzel | B65D 39/10 220/293 |
| 4,662,396 A | 5/1987 | Avnon | |
| 4,887,513 A | * 12/1989 | Ewald | B60T 17/083 92/128 |
| 5,029,607 A | 7/1991 | Blazek et al. | |

(Continued)

FOREIGN PATENT DOCUMENTS

| | | |
|---|---|---|
| DE | 202013001553 U1 | 4/2013 |
| WO | 2010066377 A1 | 6/2010 |

OTHER PUBLICATIONS

Bendix Spicer Foundation Brake LLC, "Bendix EverSure Spring Brake With No Touch Technology," Service Data Sheet No. SD-02-4525, pp. 1-8 (2011).

*Primary Examiner* — Bradley King
(74) *Attorney, Agent, or Firm* — Reising Ethington P.C.

(57) ABSTRACT

A plug for sealing an aperture in a brake actuator housing is provided that provides improvements in installation and retention of the plug and protection for sealing surfaces. The plug includes a retention member including a body defining an aperture configured for alignment with the actuator housing aperture along an axis extending through the apertures. The retention member further includes a plurality of alignment tabs extending radially from the body. The tabs are configured to be received within a plurality of notches formed in a retaining ring affixed to the housing when the retention member is disposed in an unlocked position and configured to be disposed on a first side of the retaining ring when the retention member is rotated about the axis to a locked position. The plug further includes a seal configured to be received within the aperture in the body. The seal closes the second aperture.

20 Claims, 5 Drawing Sheets

(56) References Cited

U.S. PATENT DOCUMENTS

| | | | | |
|---|---|---|---|---|
| 5,315,918 A | * | 5/1994 | Pierce | B60T 17/083 |
| | | | | 403/270 |
| 5,325,981 A | * | 7/1994 | Klomhaus | B62D 25/24 |
| | | | | 116/227 |
| 5,443,175 A | * | 8/1995 | Kelly | B65D 17/506 |
| | | | | 220/212.5 |
| 5,460,076 A | | 10/1995 | Pierce et al. | |
| 5,836,233 A | | 11/1998 | Rumsey | |
| 6,389,954 B1 | | 5/2002 | Constantinides et al. | |
| 7,377,370 B2 | | 5/2008 | Huber et al. | |
| 8,336,728 B2 | * | 12/2012 | Forrest | B65D 17/506 |
| | | | | 220/254.8 |
| 8,596,483 B2 | * | 12/2013 | Molnar | F02F 7/0073 |
| | | | | 220/300 |
| 2003/0197013 A1 | * | 10/2003 | Conti | B65D 21/0219 |
| | | | | 220/297 |
| 2013/0075212 A1 | * | 3/2013 | Darner | B60T 17/002 |
| | | | | 188/70 R |
| 2013/0146404 A1 | | 6/2013 | Iraschko | |
| 2013/0292216 A1 | | 11/2013 | Bradford et al. | |
| 2014/0305121 A1 | * | 10/2014 | Derouault | B60T 17/083 |
| | | | | 60/583 |

\* cited by examiner

PLUG RETENTION SYSTEM FOR A BRAKE ACTUATOR

BACKGROUND OF THE INVENTION a. Field of the Invention

This invention relates to vehicle brakes. In particular, the invention relates to a plug for sealing an aperture in a brake actuator.

b. Background Art

Conventional spring-based brake actuators typically include one or more apertures in the housing of the actuator to provide access to components within the housing. For example, an actuator housing will often include an aperture permitting access to a parking brake chamber in order to permit manual release of the parking brake. Brake actuator components may degrade over time from fluids and other contaminants that enter the actuator housing through such apertures. In order to address this issue, some brake actuators employ vent holes to permit contaminants to escape from the housing. Other brake actuators attempt to seal apertures in the housing to prevent contaminants from entering the housing. These latter actuators frequently employ a dust plug that is inserted in the aperture when the aperture is not in use. Conventional dust plugs, however, are frequently discarded by vehicle operators and maintenance personnel following removal of the dust plug because they can be difficult to reinstall. Further, if an individual does reinstall the dust plug, the dust plugs is often installed incorrectly. Conventional dust plugs are also subject to displacement by vibration during normal vehicle operation.

The inventor herein has recognized a need for a plug for sealing an aperture in a brake housing that will address one or more of the above-identified deficiencies.

BRIEF SUMMARY OF THE INVENTION

This invention relates to vehicle brakes. In particular, the invention relates to a plug for sealing an aperture in a brake actuator.

A plug for sealing a first aperture in an associated housing of a brake actuator in accordance with one embodiment of the present teachings includes a retention member including a body defining a second aperture configured for alignment with the first aperture along an axis extending through the first and second apertures. The retention member further includes a plurality of alignment tabs extending radially from the body. The plurality of alignment tabs are configured to be received within a plurality of notches formed in a retaining ring affixed to the housing when the retention member is disposed in an unlocked position and are configured to be disposed on a first side of the retaining ring when the retention member is rotated about the axis to a locked position. The plug further includes a seal configured to be received within the second aperture, the seal closing the second aperture.

A plug for sealing a first aperture in an associated housing of a brake actuator in accordance with another embodiment of the present teachings includes a retention member including a body defining a second aperture configured for alignment with the first aperture along an axis extending through the first and second apertures. The retention member further includes means for inhibiting movement of the retention member along the axis when the body is rotated about the axis from an unlocked position with respect to a retaining ring affixed to the housing to a locked position. The plug further includes a seal configured to be received within the second aperture, the seal closing the second aperture.

A brake actuator in accordance with one embodiment of the present teachings includes a housing defining a parking chamber having a first aperture and a service chamber having a second aperture. The actuator further includes a service diaphragm disposed within the service chamber and configured for movement in a first direction in response to fluid pressure on a first side of the service diaphragm. The actuator further includes a service spring disposed within the service chamber on a second side of the service diaphragm and urging the service diaphragm in a second direction. The actuator further includes a service pushrod coupled to the service diaphragm and extending outward from the service chamber of the housing through the second aperture. The actuator further includes a parking diaphragm disposed within the parking chamber and configured for movement in the second direction in response to fluid pressure on a first side of the parking diaphragm. The actuator further includes a parking spring disposed within the parking chamber on a second side of the parking diaphragm and urging the parking diaphragm in the first direction. The actuator further includes a parking pushrod coupled to the parking diaphragm and extending outward from the parking chamber into the service chamber on the first side of the service diaphragm. The actuator further includes a retaining ring affixed to an external surface of the housing and disposed about the first aperture. The retaining ring has a first side facing the housing and a second side facing away from the housing and defines a plurality of notches in a radially inner perimeter. The actuator further includes a plug for sealing the first aperture. The plug includes a retention member including a body defining a third aperture configured for alignment with the first aperture along an axis extending through the first and third apertures. The retention member further includes a plurality of alignment tabs extending radially from the body. The plurality of alignment tabs are configured to be received within the plurality of notches when the retention member is disposed in an unlocked position and are configured to be disposed on the first side of the retaining ring when the retention member is rotated about the axis to a locked position. The plug further includes a seal configured to be received within the third aperture, the seal closing the third aperture.

A plug for a brake actuator in accordance with the present teachings represents an improvement relative to conventional brake actuator plugs. The plug may be installed more easily than existing plugs. The plug is also less likely to be displaced due to vibration. The plug also protects sealing surfaces from fluids, contaminants and ultraviolet light.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
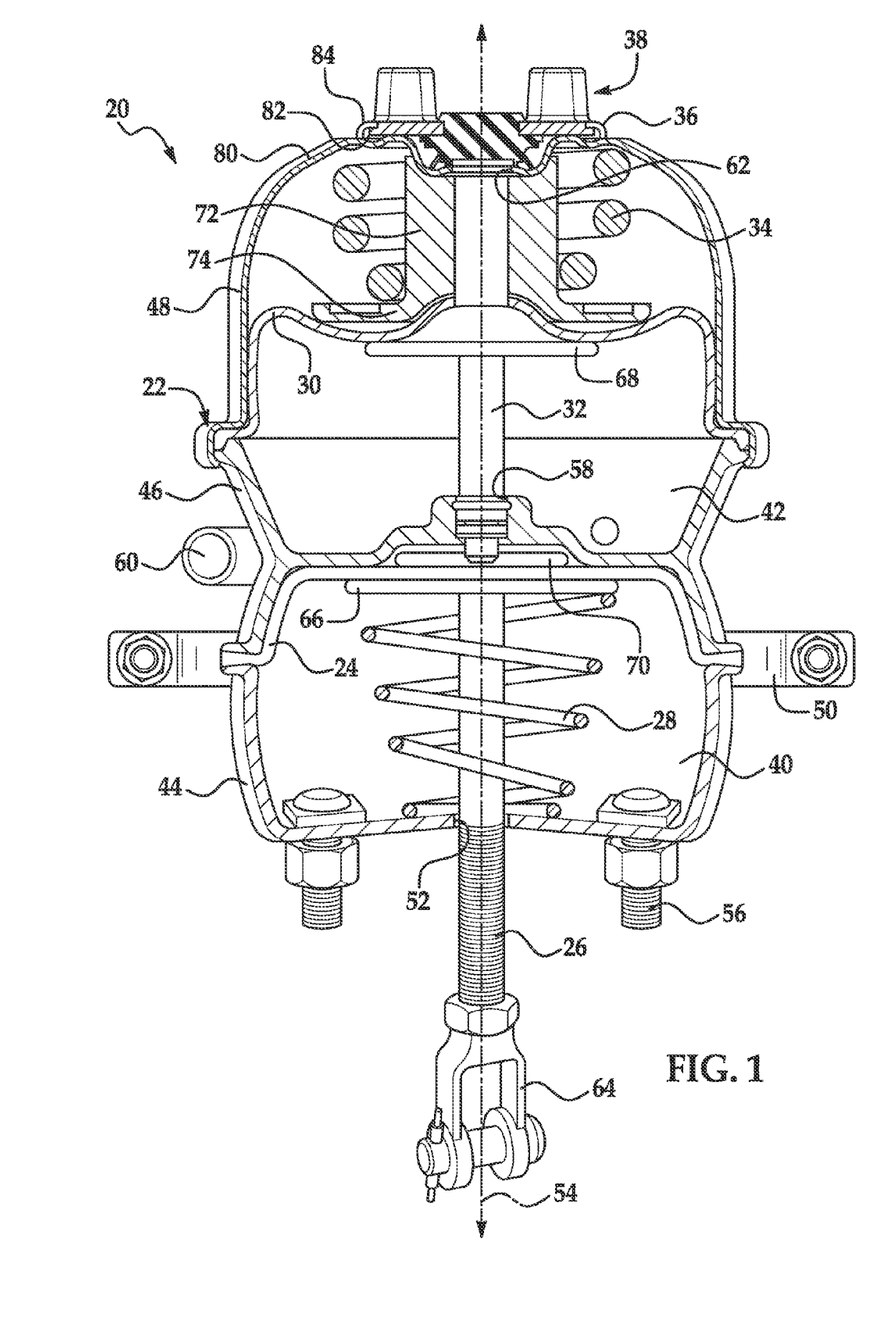
FIG. 1 is a cross-sectional view of a brake actuator in accordance with one embodiment of the present teachings.

Referring now to the drawings wherein like reference numerals are used to identify identical components in the various views, FIG. 1 illustrates a brake actuator 20 in accordance with one embodiment of the present teachings. Actuator 20 is provided to control actuation and release of brakes associated with one or more vehicle wheels. Actuator 20 may include a housing 22, a service diaphragm 24, a service pushrod 26 movable between a service release position (shown in FIG. 2) and service apply position, a service spring 28, a parking diaphragm 30, a parking pushrod 32 movable between a parking release position (shown in FIG. 2) and a parking apply position, a parking spring 34, a retaining ring 36 and a plug 38.

Housing 22 provides structural support for the other components of actuator 20 and protects those components from foreign objects and elements. Housing 22 further defines a service brake chamber 40 and a parking brake chamber 42. Housing 22 may include multiple housing members 44, 46, 48. Members 44, 46 together define service brake chamber 40 and receive service diaphragm 24 therebetween. Members 44, 46 may be held in place by a conventional clamp 50 disposed about the circumference of housing 22. Member 44 defines a central aperture 52 centered about an axis 54 and through which service pushrod 26 extends. Member 44 also defines surrounding apertures through which mounting bolts 56 may extend for mounting actuator 20 within the vehicle. Conventional nuts and washers may be disposed about bolts 56 to securely fasten actuator 20 to the vehicle. Member 46 defines a central aperture 58 centered about axis 54 and through which parking pushrod 32 extends. Member 46 further defines several fluid ports (not shown) through which fluid pressure may be introduced to service brake chamber 40 and/or parking brake chamber 42 to urge service and/or parking diaphragms 24, 30 towards predetermined positions. Member 46 may also define a storage cavity 60 for storing a release tool (not shown) used to manually release the parking brake. Members 46, 48 together define parking brake chamber 42 and receive parking diaphragm 30 therebetween. Members 46, 48 may be held in place by crimping one or both of members 46, 48 or through the use of a clamp as described above or other conventional fasteners. Member 48 define a central aperture 62 centered about axis 54 through which a release tool may be inserted to release the parking brake.

Service diaphragm 24 is provided to urge service pushrod 26 outward from actuator 20 in response to fluid pressure in order to cause application of the vehicle brakes. Diaphragm 24 is conventional in the art. Diaphragm 24 is disposed within chamber 40 and may be held between members 44, 46 of housing 22. Fluid pressure may be introduced to service chamber 40 on one side of diaphragm 24 opposite the side on which service pushrod 26 is disposed through a service port (not shown) in member 46. Introduction of fluid pressure to chamber 40 urges service pushrod 26 to a service apply position.

Service pushrod 26 transfers forces generated in actuator 20 to the vehicle brakes in order to apply or release the brakes. Pushrod 26 is disposed about and moves along axis 54. Pushrod 26 may define a yoke 64 at one end of the pushrod 26 disposed outside of housing 22. In a conventional drum brake, for example, the yoke 64 may be coupled to a slack adjuster that is disposed about a camshaft and translates linear movement of the service pushrod 26 into rotational movement of the camshaft and a cam mounted on one end of the camshaft. Rotation of the cam then causes corresponding movement of brakes shoes into and out of engagement with a braking surface in a drum. Pushrod 26 may define a pressure plate 66 at an opposite end from yoke 64. Plate 66 provides a surface on one side configured to engage diaphragm 24 and a surface on the opposite side configured to act as a spring seat for spring 28.

Service spring 28 is provided to bias service pushrod 26 to a service release position. Spring 28 is conventional in the art and is disposed within service brake chamber 40 on one side of service diaphragm 24. Spring 28 is disposed about service pushrod 26 and is seated between member 44 of housing 22 and pressure plate 66 of pushrod 26.

Parking diaphragm 30 is provided to urge parking pushrod 32 in one direction along axis 54 away from the parking apply position and towards the parking release position in response to fluid pressure in order to release the vehicle brakes. Diaphragm 30 is conventional in the art. Diaphragm 30 is disposed within chamber 42 and may be held between members 46, 48 of housing 22. Fluid pressure may be introduced to chamber 42 on one side of diaphragm 30 through a parking port (not shown) in member 46. Introduction of fluid pressure to chamber 42 urges parking pushrod 32 to a parking release position against the force of parking spring 34.

Parking pushrod 32 is provided to cause selective movement of service diaphragm 24 and service pushrod 26 in order to apply a parking brake. Pushrod 32 is disposed about and moves along axis 54 and may be axially aligned with service pushrod 26. Pushrod 32 extends from parking chamber 42 into service chamber 40. Pushrod 32 includes a pressure plate 68 at one longitudinal end configured to engage parking diaphragm 30 such that pushrod 32 is configured for movement with diaphragm 30. Pushrod 32 includes another pressure plate 70 at an opposite longitudinal end configured for selective engagement with service diaphragm 24.

Parking spring 34 is provided to bias parking pushrod 32 to a parking apply position (and thereby move service pushrod to a service apply position). Spring 34 is conventional in the art and is disposed within parking brake chamber 42 on one side of parking diaphragm 30. Spring 34 is disposed about a hub 72 having a flange 74 at one end with a first side bearing against parking diaphragm 30 and a second side that functions as a spring seat for spring 34.

Figure 11:
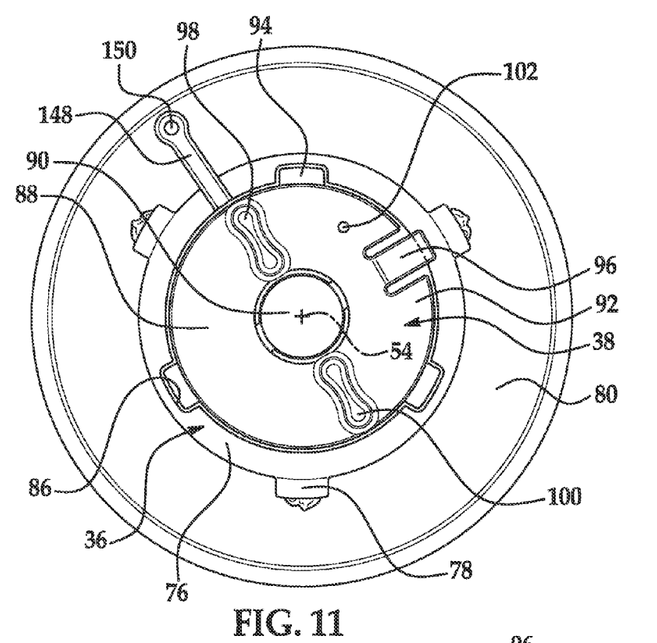
FIGS. 11-12 are perspective views showing the plug of FIGS. 2-4 in an unlocked and locked position.
Figure 12:
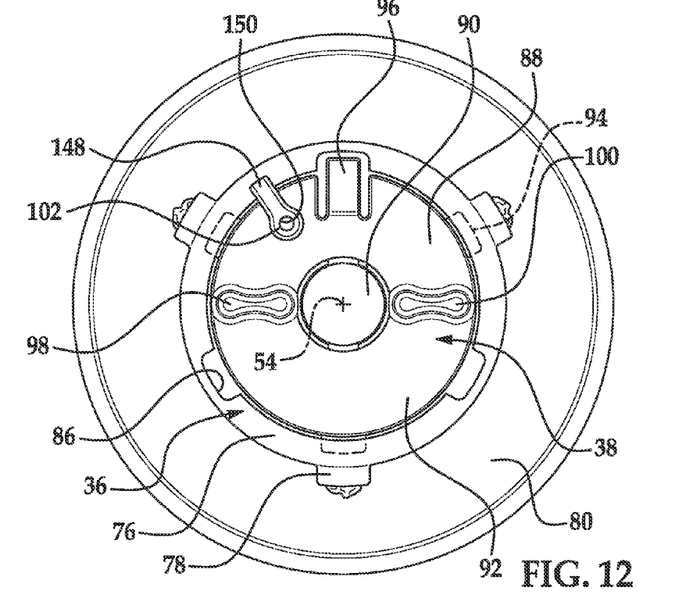

Retaining ring 36 provides a means for retaining plug 38 in a predetermined position relative to housing 22 and, in particular, aperture 62 of member 48 of housing 22. Referring to FIGS. 11-12, ring 36 includes an body 76 and a plurality of legs 78.

Body 76 is annular in shape and is disposed about, and may be centered about, axis 54. Referring again to FIG. 1, body 76 is axially spaced from an external surface 80 of member 48 of housing 22 and includes a first side 82 facing towards surface 80 and a second side 84 facing away from surface 80. Referring again to FIGS. 11-12, body 76 includes a plurality of notches 86 formed in a radially inner perimeter of body 76. In the illustrated embodiment, body 76 includes three rectangular notches 86 that are equally circumferentially spaced about axis 54. It should be understood, however, that the number, shape and spacing of notches 86 may vary.

Legs 78 affix body 76 to member 48 of housing 22 and space body 76 from member 48 of housing 22. Legs 78 may be formed with body 76 as a unitary structure. One end of each leg 78 is affixed to body 76 while an opposite end of each leg 78 is affixed to member 48 of housing 22. Legs 78 may be affixed to member 48 of housing 22 using conventional fasteners such as welds. In the illustrated embodiment, ring 36 includes three legs 78 that are equally circumferentially spaced about axis 54. It should be understood, however, that the number and spacing of legs 78 may vary. For example, in one constructed embodiment, ring 36 includes six legs 78 that are equally circumferentially spaced about axis 54. In accordance with one aspect of the present teachings, the spacing between legs 78 provides drainage for water and other fluids. It should be understood, however, that ring 36 may alternatively include a single leg may extend around the entire circumference of body 76 and extend between body 76 and surface 80 of housing 22.

Figure 2:
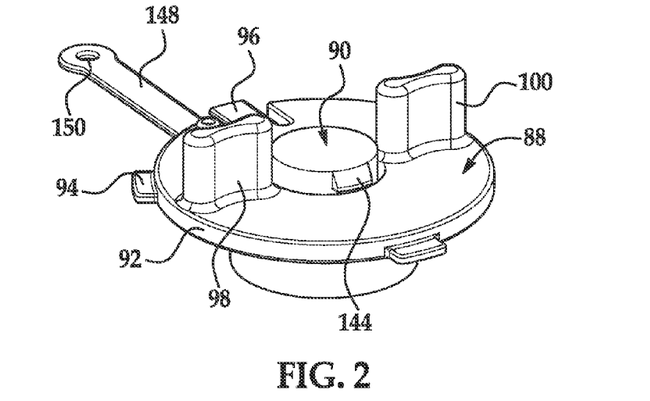
FIG. 2 is a perspective view of a plug for sealing an aperture in a housing of a brake actuator in accordance with one embodiment of the present teachings.
Figure 3:
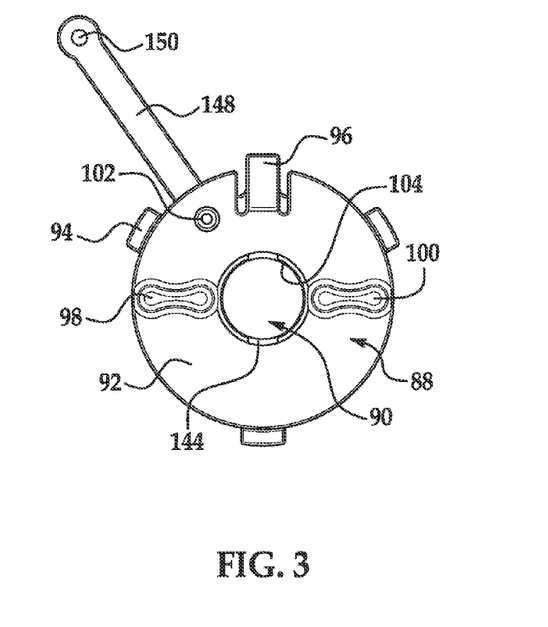
FIG. 3 is a top view of the plug of FIG. 2.
Figure 4:
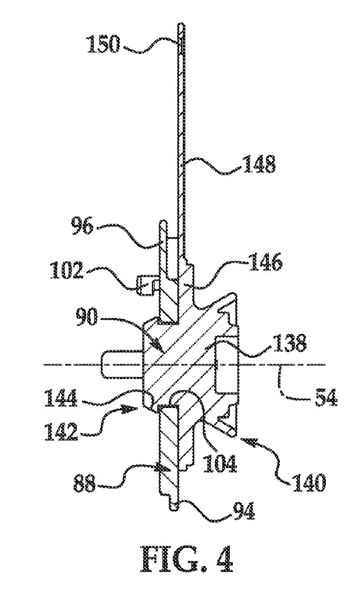
FIG. 4 is a cross-sectional view of the plug of FIG. 2.

Referring now to FIGS. 2-4, plug 38 is provided to seal aperture 62 of member 48 of housing 22. Plug 38 includes a retention member 88 and a seal 90.

Retention member 88 is provided to securely position and orient seal 90 relative to aperture 62 in housing 22. Member 88 may be made from plastic materials. Member 88 includes a body 92, means, such as alignment tabs 94, for inhibiting movement of retention member 88 along axis 54, means, such as deformable locking tab 96, for inhibiting rotation of retention member 88 about axis 54, means, such as handles 98, 100, for gripping retention member 88 to cause rotation of retention member 88, and a post 102.

Body 92 positions and orients the other components of plug 38 and provides structural support for such components. Body 92 may be substantially circular in shape with an outer diameter sized to be received within body 76 of retaining ring 36. Body 92 is annular and defines an aperture 104 that is configured for alignment with aperture 62 in housing 22. Aperture 104 may be disposed about, and may be centered about, axis 54 upon assembly with actuator 20.

Tabs 94 provide a means for inhibiting movement of retention member 88 along axis 54. Tabs 94 extend radially outward from body 92 and are configured to be received within notches 86 in body 76 of retaining ring 36 when retention member 88 is in a first, unlocked position (FIG. 11) and on side 82 of body 76 of retaining ring 36 when retention member 88 is in a second, locked position (FIG. 12). Tabs 94 may have a reduced width in the direction of axis 54 relative to body 92 and are disposed nearer to one axial end of body 92. As a result, when plug 38 is inserted within retaining ring 36, tabs 94 are not radially aligned with body 76 of retaining ring 36 and are disposed nearer to external surface 80 of housing 22 than body 76. Rotation of plug 38 about axis 54 from the unlocked position (FIG. 11)—in which tabs 94 are disposed within notches 86—to a locked position (FIG. 12) locates tabs 94 between surface 80 and side 82 of body 76 of retaining ring 36 and thereby prevents movement of retention member 88 along axis 54. In the illustrated embodiment, retention member 88 includes three rectangular tabs 94 that are equally circumferentially spaced about axis 54. It should be understood, however, that the number, shape and spacing of tabs 94 may vary.

Locking tab 96 provides a means for inhibiting rotation of retention member 88 about axis 54 when retention member 88 is in the locked position. Locking tab 96 extends radially outward from body 92. Tab 96 may be longer than tab 94. In particular, a radially inner end of tab 96 may be disposed nearer to axis 54 than the radially inner ends of tabs 94 (although the radially outer ends of tabs 94, 96 may be located at the same distance from axis 54). Like tabs 94, tab 96 may have a reduced width in the direction of axis 54 relative to body 92 and may be disposed nearer to one axial end of body 92. Referring to FIG. 4, tab 96 may be disposed at an opposite axial end of body 92 relative to tabs 94. Tab 96 is deformable. When plug 38 is first inserted into retaining ring 36 and retention member 88 is in the unlocked position (FIG. 11), tab 96 is deformed from an unstressed state to a stressed state in which tab 96 is disposed on side 84 of body 76 of retaining ring 36. Upon rotation of retention member 88 to a locked position (FIG. 12), tab 96 is brought into alignment with one of notches 86 in body 76 of retaining ring 36. Locking tab 96 then returns from its stressed state to an unstressed state and is disposed within the notch 86. In this unstressed state, locking tab 96 is aligned with body 76 thereby prevents rotation of retention member 88 in either rotational direction about axis 54.

Handles 98, 100 provide a means for gripping retention member 88 to cause rotation of retention member 88. Handles 98, 100 extend axially from a side of body 92 that faces away from surface 80 of housing 22. Referring to FIG. 3, handles 98, 100 may extend longitudinally in a radial direction. In the illustrated embodiment, each handle 98, 100 is wider proximate each longitudinal end of the handle 98, 100 than intermediate the longitudinal ends of the handle 98, 100. This shape, along with the rounded surface, facilitates grasping the handles 98, 100 by a human hand. Handles 98, 100 may be diametrically opposite one another relative to axis 54. It should be understood, however, that the number, shape and orientation of handles 98, 100 may vary.

Post 102 provides a means for securing seal 90 against rotation relative to retention member 88. As discussed in greater detail hereinbelow, a portion of seal 90 may be affixed to post 102 to inhibit relative rotation of seal 90. Post 102 extends axially from the same side of body 92 as handles 98, 100.

Figure 5:
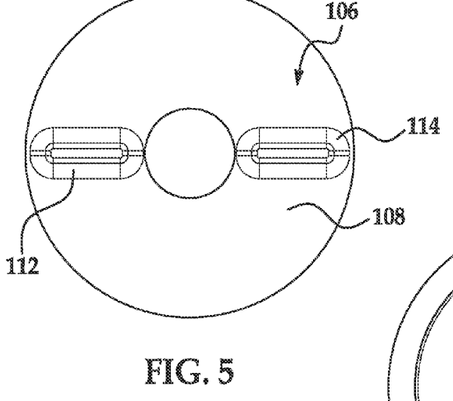
FIGS. 5-6 are top and bottom views of a portion of a plug for sealing an aperture in a housing of a brake actuator in accordance with another embodiment of the present teachings.
Figure 6:
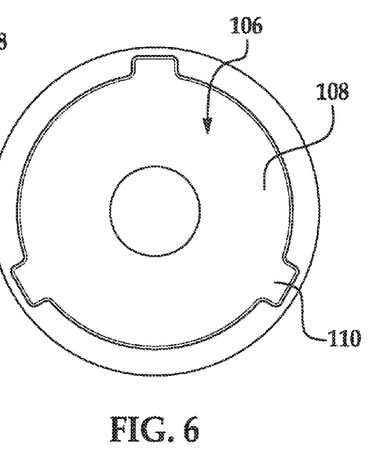

Although a particular embodiment of retention member 88 has been illustrated in FIGS. 2-4, retention member 88 may take on a variety of alternate forms. Referring to FIGS. 5-6, a retention member 106 in accordance with another embodiment of the present teachings is shown. Member 106 includes a body 108, means, such as alignment tabs 110, for inhibiting movement of retention member 106 along axis 54 and means, such as handles 112, 114 for gripping retention member 106 to cause rotation of retention member 106. Body 108 is similar to body 92 of retention member 88. Body 108 differs from body 92 in that the outer diameter of body 108 may vary along the axial length of body 108. In particular, body 108 may have a larger outer diameter proximate one axial end from which handles 112, 114 extend and a smaller outer diameter proximate the opposite axial end from which tabs 110 extend. As a result, the larger diameter portion of body 108 may be configured to engage side 84 of body 76 of retaining ring 36 while the smaller diameter portion of body 108 is disposed within and radially aligned with body 76 of retaining ring 36. Handles 112, 114 are similar to handles 98, 100 of retention member 88, but may have a substantially uniform width between the longitudinal ends of each handle 112, 114.

Figure 7:
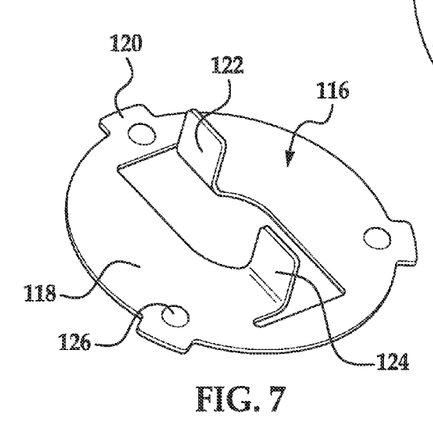
FIG. 7 is a perspective view of a portion of a plug for sealing an aperture in a housing of a brake actuator in accordance with another embodiment of the present teachings.

Referring now to FIG. 7, a retention member 116 in accordance with another embodiment of the present teachings is shown. Unlike members 88, 106, member 116 may be made from conventional metals through a stamping process. Member 116 includes a body 118, means, such as alignment tabs 120, for inhibiting movement of retention member 116 along axis 54 and means, such as handles 122, 124 for gripping retention member 116 to cause rotation of retention member 116. Body 118 is similar to body 92 of retention member 88. Tabs 120, however, differ from tabs 94 of member 88 in that tabs 120 have the same width in an axial direction as body 118. As a result, when retention member 116 is located within retaining ring 36, body 118 is not aligned with the radially inner surface of body 76 of retaining ring 36. Body 118 therefore includes semi spherical projections 126 proximate each alignment tab 120 that are configured to engage the radially inner surface of body 76 of retaining ring 36 and prevent lateral translation of retention member 116. Handles 122, 124 may be formed by bending portions of body 118.

Figure 8:
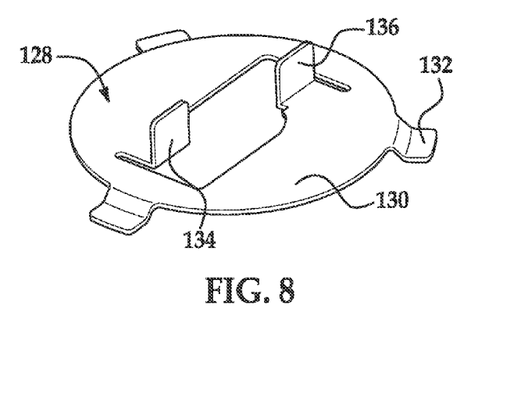
FIG. 8 is a perspective view of a portion of a plug for sealing an aperture in a housing of a brake actuator in accordance with another embodiment of the present teachings.

Referring now to FIG. 8, a retention member 128 in accordance with another embodiment of the present teachings is shown. Like member 116, member 128 may be made from conventional metals through a stamping process. Member 128 includes a body 130, means, such as alignment tabs 132, for inhibiting movement of retention member 128 along axis 54 and means, such as handles 134, 136 for gripping retention member 128 to cause rotation of retention member 128. Unlike member 116, the alignment tabs 132 on member 126 are bent such that a radially outer portion of each tab 132 is axially spaced from body 130. In this embodiment, when retention member 128 is located within retaining ring 36, body 130 is aligned with the radially inner surface of body 76 of retaining ring 36 to prevent lateral translation of retention member 128 while tabs 132 may be disposed on side 82 of body 76. Handles 134, 136 may again be formed by pending portions of body 130.

Figure 9:
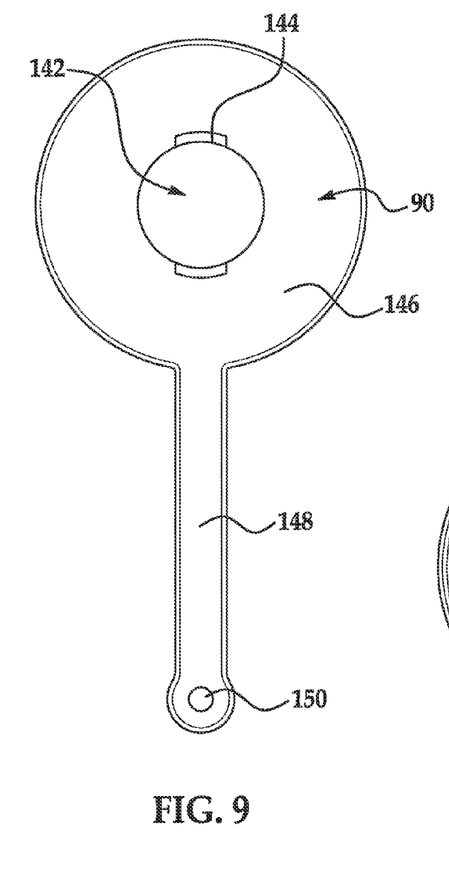
FIGS. 9-10 are top and bottom views of a seal portion of the plug of FIGS. 2-4.
Figure 10:
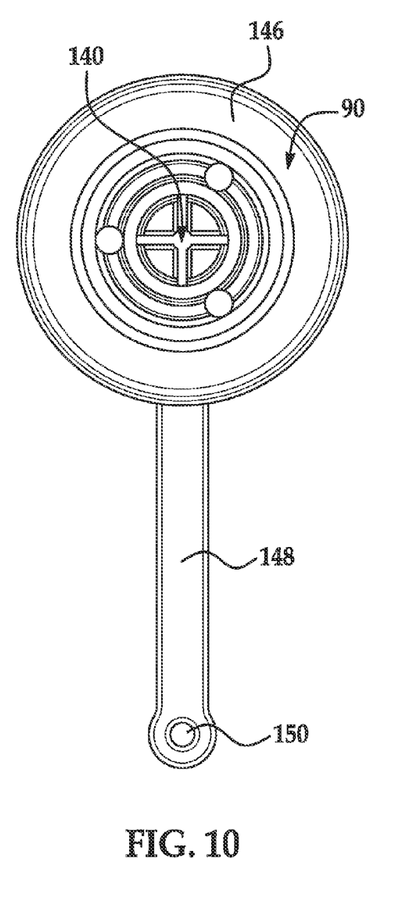

Referring now to FIGS. 9-10, seal 90 is provided to seal aperture 62 in housing 22 against infiltration of water, dust and other contaminants. Seal 90 includes a body 138 that is configured to be received within aperture 104 in body 92 of retention member 88 and close aperture 104. Seal 90 may be made from a material that is less rigid than the material of retention member 88 and may be made from an elastic material that aids in preloading plug 38 against retaining ring 36. In particular, seal 90 may be made from rubber or similar resilient material. Referring to FIG. 4, the radially outer diameter of body 138 may vary along the axial length of body 138. Proximate one axial end 140, body 138 may flare outwardly and establish a perimeter configured to surround aperture 62 in housing 22 when plug 38 is located within retaining ring 36. Proximate an opposite axial end 142, body 138 may define one or more radially extending deformable tabs 144. Tabs 144 are configured to permit movement of seal 90 in one axial direction through aperture 104 in body 92 of retention member 88 (in order to assemble plug 38), but inhibit movement of seal 90 in the opposite axial direction through aperture 104. Intermediate axial ends 140, 142, body 138 may define a relatively wide diameter portion 146 configured to engage one side of body 92 of retention member 88 when seal 90 is inserted through aperture 104. Tabs 144 and portion 146 combine to prevent movement of seal 90 relative to retention member 88 along axis 54 upon assembly. Body 138 may further define a radially extending strap 148 that extends from portion 146. Referring to FIG. 4, strap 148 has a first end that is connected to portion 146 of body 138 and is disposed on one side of body 92 of retention member 88—the side facing surface 80 of housing 22. Referring to FIGS. 9-10, the opposite end of strap 148 is configured for coupling to post 102 on the opposite side of body 92. In particular, strap 148 defines an aperture 150 configured to receive post 102. Once retention member 88 is rotated to the locked position, strap 148 extends outward between two legs 78 of retaining ring 36 on side 82 of body 76 of retaining ring 36. Strap 78 may then be bent back over side 84 of body 76 and secured to post 102.

Referring now to FIG. 11, the installation of plug 38 begins by orienting plug 38 such that the side of retention member 88 having handles 98, 100 and post 102 faces away from surface 80 of housing 22 and alignment tabs 94 are aligned with notches 86 in body 76 of retaining ring 36. Plug 38 is then moved along axis 54 towards surface 80 until seal 90 engages surface 80. This movement causes locking tab 96 to engage side 84 of body 76 of retaining ring 36 and to deflect from an unstressed state to a stressed state. Once seal 90 is engagement with surface 80, retention member 88 is rotated from the unlocked position shown in FIG. 11 by, for example, gripping handles 98, 100 and turning retention member 88. Referring to FIG. 12, retention member 88 is rotated until locking tab 96 is aligned with one of the notches 86 in body 76 of retaining ring 36. Once aligned, locking tab 96 snaps down as it returns to its unstressed state—providing the installer with tactile and other feedback indicating proper installation of plug 38. The strap 148 of seal 90 is then looped over body 76 of retaining ring 36 and affixed to post 102.

A plug 38 for a brake actuator 20 in accordance with the present teachings represents an improvement relative to conventional brake actuator plugs. The plug 36 may be installed more easily than existing plugs. As discussed hereinabove, plug 36 is installed by simply aligning the plug 36 with the other components of the actuator, moving the plug 36 along an axis 54 towards the actuator housing 22 and then rotating the plug about that axis 54. Upon rotation, movement of the locking tab 96 provides the installer with tactile and other feedback that the plug 38 is properly seated thereby rendering improper installation unlikely. The plug 38 is also less likely to be displaced due to vibration. A plug 38 in accordance with the present teachings inhibits movement in six degrees of freedom. The location of the alignment tabs 94 between surface 80 of housing 22 and side 82 of body 76 of retaining ring 36 prevents movement of plug 38 along axis 54. The complementary shapes of body 92 of retention member 88 and body 76 of retaining ring 36 prevent movement of plug 38 in a plane perpendicular to axis 54. The alignment of locking tab 96 with body 76 of retaining ring 36 prevents rotation of plug 38 about axis 54. Finally, the interference between body 92 of retention member 88 and surface 80 of housing 22 prevents rotation of plug 38 about pitch and roll axes perpendicular to axis 54. Plug 38 also better protects sealing surfaces from fluids, contaminants and ultraviolet light. Because the portion of seal 90 surrounding aperture 62 in housing 22 is shielded by body 92, seal 90 is less exposed to fluids, contaminants and ultraviolet light.

While the invention has been shown and described with reference to one or more particular embodiments thereof, it will be understood by those of skill in the art that various changes and modifications can be made without departing from the spirit and scope of the invention.

What is claimed is:

1. A plug for sealing a first aperture in a housing of a brake actuator, comprising:
  a retention member including
    a body defining a second aperture configured for alignment with said first aperture along an axis extending through said first and second apertures;
    a plurality of alignment tabs extending radially from said body, said plurality of alignment tabs configured to be received within a plurality of notches formed in a retaining ring affixed to said housing when said retention member is disposed in an unlocked position and configured to be disposed on a first side of said retaining ring when said retention member is rotated about said axis to a locked position; and,
  a seal configured to be received within said second aperture, said seal closing said second aperture
  wherein said retention member further includes a deformable locking tab configured to be disposed on a second side of said retaining ring when said retention member is in said unlocked position and disposed within one of said plurality of notches when said retention member is in said locked position.

2. The plug of claim 1 wherein said locking tab is deformed from an unstressed state to a stressed state when said retention member is in said unlocked position and returns to said unstressed state when said retention member is in said locked position.

3. The plug of claim 1 wherein said retention member includes a first handle extending axially from a first side of said body.

4. The plug of claim 3 wherein said retention member includes a second handle extending axially from said first side of said body.

5. The plug of claim 4 wherein said first and second handles are diametrically opposite one another relative to said axis.

6. The plug of claim 3 wherein said first handle is wider proximate each longitudinal end of said first handle than intermediate said longitudinal ends of said first handle.

7. The plug of claim 1 wherein said body defines a post extending from a first side of said body and said seal includes a radially extending strap having a first end disposed on a second side of said body and a second end configured for coupling to said post.

8. The plug of claim 1 wherein said seal is configured to prevent movement of said seal relative to said retention member along said axis.

9. The plug of claim 1 wherein said seal includes a radially extending deformable tab, said tab configured to permit movement of said seal in a first axial direction through said second aperture and inhibit movement of said seal in a second axial direction through said second aperture.

10. A brake actuator, comprising:
  a housing defining a parking chamber having a first aperture and a service chamber having a second aperture;
  a service diaphragm disposed within said service chamber and configured for movement in a first direction in response to fluid pressure on a first side of said service diaphragm;
  a service spring disposed within said service chamber on a second side of said service diaphragm and urging said service diaphragm in a second direction;
  a service pushrod coupled to said service diaphragm and extending outward from said service chamber of said housing through said second aperture;
  a parking diaphragm disposed within said parking chamber and configured for movement in said second direction in response to fluid pressure on a first side of said parking diaphragm;
  a parking spring disposed within said parking chamber on a second side of said parking diaphragm and urging said parking diaphragm in said first direction;
  a parking pushrod coupled to said parking diaphragm and extending outward from said parking chamber into said service chamber on said first side of said service diaphragm;
  a retaining ring affixed to an external surface of said housing and disposed about said first aperture, said retaining ring having a first side facing said housing and a second side facing away from said housing and defining a plurality of notches in a radially inner perimeter; and,
  a plug for sealing said first aperture, comprising:
    a retention member including
      a body defining a third aperture configured for alignment with said first aperture along an axis extending through said first and third apertures;
      a plurality of alignment tabs extending radially from said body, said plurality of alignment tabs configured to be received within said plurality of notches when said retention member is disposed in an unlocked position and configured to be disposed on said first side of said retaining ring when said retention member is rotated about said axis to a locked position; and,
    a seal configured to be received within said third aperture, said seal closing said third aperture
    wherein said retention member further includes a deformable locking tab configured to be disposed on said second side of said retaining ring when said retention member is in said unlocked position and disposed within one of said plurality of notches when said retention member is in said locked position.

11. The brake actuator of claim 10 wherein said locking tab is deformed from an unstressed state to a stressed state when said retention member is in said unlocked position and returns to said unstressed state when said retention member is in said locked position.

12. The brake actuator of claim 10 wherein said retention member includes a first handle extending axially from a first side of said body.

13. The brake actuator of claim 12 wherein said retention member includes a second handle extending axially from said first side of said body.

14. The brake actuator of claim 13 wherein said first and second handles are diametrically opposite one another relative to said axis.

15. The brake actuator of claim 12 wherein said first handle is wider proximate each longitudinal end of said first handle than intermediate said longitudinal ends of said first handle.

16. The brake actuator of claim 10 wherein said body defines a post extending from a first side of said body and said seal includes a radially extending strap having a first end disposed on a second side of said body and a second end configured for coupling to said post.

17. The brake actuator of claim 10 wherein said seal is configured to prevent movement of said seal relative to said retention member along said axis.

18. The brake actuator of claim 10 wherein said seal includes a radially extending deformable tab, said tab configured to permit movement of said seal in a first axial direction through said third aperture and inhibit movement of said seal in a second axial direction through said third aperture.

19. The brake actuator of claim 10 wherein said retaining ring includes
- a body axially spaced from said external surface of said housing; and,
- a plurality of circumferentially spaced legs extending between said body and said external surface of said housing.

20. A brake actuator, comprising:
- a housing defining a parking chamber having a first aperture and a service chamber having a second aperture;
- a service diaphragm disposed within said service chamber and configured for movement in a first direction in response to fluid pressure on a first side of said service diaphragm;
- a service spring disposed within said service chamber on a second side of said service diaphragm and urging said service diaphragm in a second direction;
- a service pushrod coupled to said service diaphragm and extending outward from said service chamber of said housing through said second aperture;
- a parking diaphragm disposed within said parking chamber and configured for movement in said second direction in response to fluid pressure on a first side of said parking diaphragm;
- a parking spring disposed within said parking chamber on a second side of said parking diaphragm and urging said parking diaphragm in said first direction;
- a parking pushrod coupled to said parking diaphragm and extending outward from said parking chamber into said service chamber on said first side of said service diaphragm;
- a retaining ring affixed to an external surface of said housing and disposed about said first aperture, said retaining ring having a first side facing said housing and a second side facing away from said housing and defining a plurality of notches in a radially inner perimeter; and,
- a plug for sealing said first aperture, comprising:
  - a retention member including
    - a body defining a third aperture configured for alignment with said first aperture along an axis extending through said first and third apertures;
    - a plurality of alignment tabs extending radially from said body, said plurality of alignment tabs configured to be received within said plurality of notches when said retention member is disposed in an unlocked position and configured to be disposed on said first side of said retaining ring when said retention member is rotated about said axis to a locked position; and,
  - a seal configured to be received within said third aperture, said seal closing said third aperture wherein said seal surrounds said first aperture.

\* \* \* \* \*